UNITED STATES PATENT OFFICE.

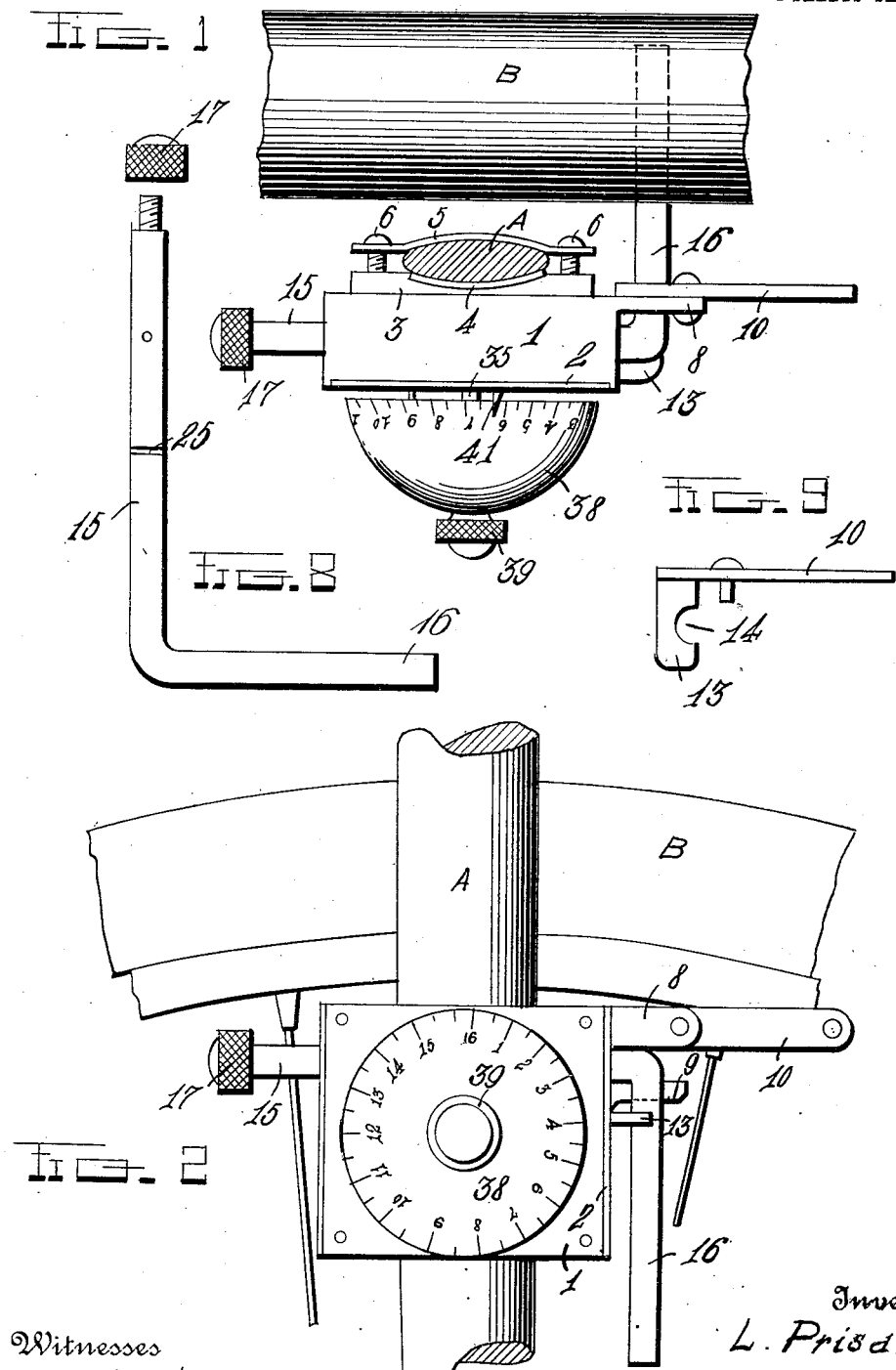

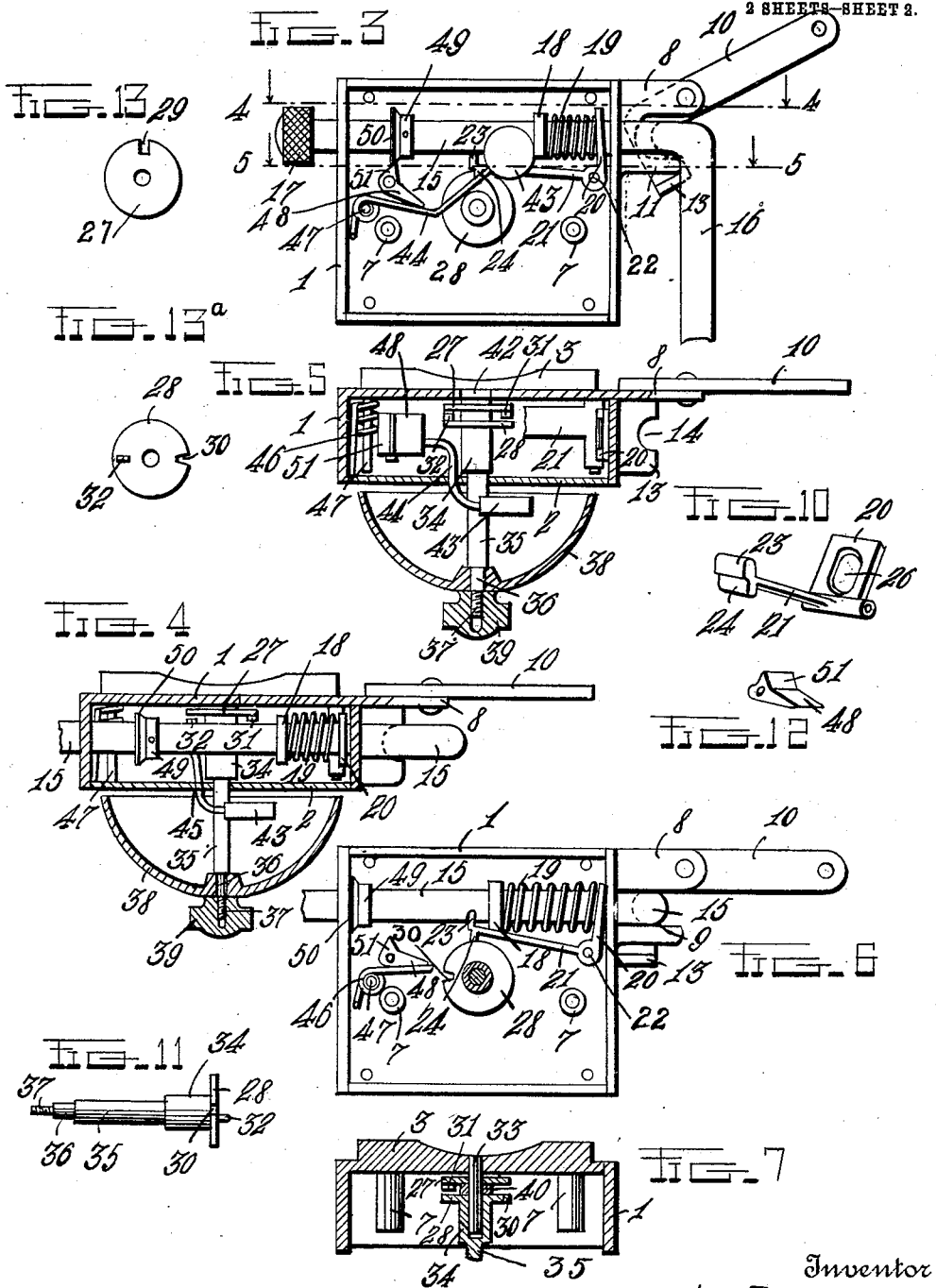

LOUIS PRISANT, OF ALBANY, GEORGIA.

COMBINED BICYCLE LOCK AND BELL.

999,150. Specification of Letters Patent. Patented July 25, 1911.

Application filed October 25, 1909. Serial No. 524,407.

*To all whom it may concern:*

Be it known that I, LOUIS PRISANT, a citizen of the United States, residing at Albany, in the county of Dougherty and State of Georgia, have invented certain new and useful Improvements in Combined Bicycle Locks and Bells; and I do declare the following to be a full, clear, and exact description of the invention, such as will enable others skilled in the art to which it appertains to make and use the same.

This invention is a combined bicycle lock and bell.

One object of the invention is to provide a device of this character which may be employed as a lock when the bicycle is at rest and which, when the bicycle is in use, may be employed as a bell.

Another object is to provide a device having a locking mechanism controlled by a combination operated by and indicated on the bell.

With these and other objects in view, the invention consists of certain novel features of construction, combination and arrangement of parts as will be more fully described and particularly pointed out in the appended claims.

In the accompanying drawings: Figure 1 is a cross-sectional view through one side of the front fork of a bicycle taken above the wheel and showing the invention applied thereto and the locking mechanism in operative position to secure the wheel. Fig. 2, is a side view of the same parts with the locking mechanism in released position. Fig. 3, is a side view of the invention with the bell and front plate of the casing removed to disclose the arrangement of the locking and bell sounding mechanism, and showing the locking mechanism in inoperative position and in engagement with the bell clapper, which is shown as being retracted or depressed by the locking mechanism. Fig. 4, is a horizontal sectional view taken on the line 4—4 of Fig. 3. Fig. 5, is a similar view on the line 5—5, of Fig. 3. Fig. 6, is a view similar to Fig. 3, showing the parts in position to lock the front wheel of the bicycle. Fig. 7, is a detail horizontal sectional view through the casing and through the center of the bell supporting arbor and locking disks showing the construction and arrangement of these parts. Fig. 8, is a detail plan view of the combined locking and bell operating bar. Fig. 9, is a plan view of the bell operating lever. Fig. 10, is a detail perspective view of the detent of the locking mechanism. Fig. 11, is a plan view of the bell arbor and shaft of the operating mechanism. Fig. 12, is a detail perspective view of the pawl which engages the bell clapper. Fig. 13, is a detail view of one of the two disks forming the combination of the locking mechanism. Fig. 13ª is a similar view of the other disk.

Referring more particularly to the drawings, 1, denotes the casing of the locking and bell operating mechanism of the invention, said casing having a removable front plate 2. On the rear side of the casing is formed a stationary clamping member or block 3, in which is formed a concavity having arranged therein a pad or protective lining 4. Adapted to co-act with the stationary clamping member 3, is a removable clamping plate 5, which is curved midway between its ends as shown and is adapted to receive clamping screws 6, which are screwed into interiorly threaded bosses 7, formed on the inner side of the back plate of the casing as shown. By means of a fastening mechanism such as just described, the casing may be firmly secured to one side of the front fork A of a bicycle preferably opposite to the rim and tire of the front wheel B.

On one end of the casing 1, adjacent to the upper side thereof and projecting laterally therefrom, is a rigid arm or bracket 8, in the outer edge of which is formed a notch 9. Pivotally mounted on the outer end of the bracket 8, is an operating lever 10, having a rightangular downwardly projecting end 11, on the lower end of which is formed a rightangular laterally projecting plate 13. The rightangular end of the lever 10, is provided in its outer edge with a notch corresponding with the notch 9, of the bracket 8, and the rightangular plate 13, on the end 11, is provided with a notch 14. The purpose of the lever 10, and the notched end and plate of the same will be hereinafter described.

Slidably mounted in suitable apertures in the opposite ends of the casing 1, is a combined wheel locking and bell operating bar 15, said bar having on one end a rightangularly formed wheel engaging arm 16, which, when turned in a horizontal position as shown in Fig. 1 is adapted to project between the spokes of the front wheel and thereby prevent the turning of the wheel, thus locking the bicycle. On the opposite end of the bar 15, is secured a milled head 17, by means of which the bar is turned or rocked to bring the arm 16, into and out of horizontal position, thus engaging the same with and disengaging it from said wheel. On the bar 15, within the casing is secured a stop collar 18, which is engaged by one end of a coil spring 19, arranged on the bar as shown. The opposite end of the spring 19, bears against a rightangular upwardly projecting plate 20, of a locking detent 21, which is pivotally mounted on a suitable bearing stud 22, arranged in the casing. On the opposite end of the detent 21, is formed an upwardly projecting locking lug 23, and a downwardly projecting locking lug 24. The locking lug 23, is adapted to be automatically engaged with a locking notch 25, formed in the locking bar 15, when the latter is in an operative position with its rightangularly bent arm extended horizontally and into engagement with the spokes of the wheel. The plate 20, on the pivoted end of the detent 21, is preferably provided with an elongated opening 26, through which the locking bar 15 extends.

In the operation of the locking bar, the latter is pushed through the casing 1, to a sufficient extent to disengage the right angular end 16 thereof from the notch 14, in the plate 13, of the operating lever 10, after which the bar is turned or rocked to bring the arm 16, to a horizontal position between the spokes of the front wheel. In thus turning the bar 15, the notch 25, therein will be brought into the same plane as the lug 23, on the detent 21, so that when pressure is released from the bar 15, the latter will be retracted by the spring 19, until the notch 25, therein comes opposite to the lug 23, at which time the action of the spring 19, on the plate 20, of the detent will force the latter upwardly and thus engage the lug 23, with the notch 25, in the bar, thereby holding the latter in locked engagement with the wheel. When the bar 15, has thus been retracted by the spring 19, and the notch in the bar engaged by the lug 23, on the detent 21, the horizontal arm 16, of the bar will be engaged with the recess 9, in the bracket 8, and with the coinciding recess in the end 11, of the operating lever, thus positively holding the bar against any turning or rocking movement and thus holding the arm 16, in a horizontal position.

In order to prevent the movement of the detent or the disengagement of the lug 23, thereon, from the notch 25, in the locking bar when the latter is in an operative position, I provide a suitable locking mechanism which is here shown and preferably consists of two disks 27 and 28, in which at the desired location are formed notches 29 and 30. On the inner side of the disk 27, is formed a radial laterally projecting lug 31, while on the inner side of the disk 28, is formed a similar lug 32. The disk 27, is revolubly mounted on a stub shaft 33, secured in the back plate of the casing 1, and projecting into the casing as shown. The desk 28, is fixedly mounted on or forms a part of the enlarged tubular end 34, of a combined bell arbor and operating shaft 35. The enlarged tubular end of the shaft 35, is revolubly engaged with or mounted on the inner end of the stub shaft 33, while the outer end of the shaft or arbor 35, projects through the front plate of the casing and is provided on its outer end with a squared seat 36, and a reduced threaded finger 37. On the squared end 36, of the shaft or arbor 35, is mounted a bell or gong 38, which is secured to the arbor by a milled nut 39, screwed on to the threaded finger of the arbor as shown in Figs. 4 and 5. When the enlarged end of the shaft or arbor 35, is engaged with the stud shaft 33, the disk 28, on the end of said enlarged portion will be brought into juxtaposition to the disk 27, on said stub shaft and said disks are held apart in spaced relation by a washer 40, arranged on the stub shaft 33, as shown. When the detent 21, is in locking position with its lug 23, in engagement with the notch 25, in the locking bar, the lug 24, of the detent will bear against the peripheries of the disks 27 and 28 which will hold the lug 23, on the detent in engagement with the notch 25, from which position it cannot be moved until the notches 29 and 30, in the disks are brought into alinement with each other and into a position immediately beneath the lug 24, on the detent 21. When the notches have been brought into this position, the bar 15, is pulled laterally in the casing by means of the lever 10, thus forcing the detent downwardly and the lug 24, thereon into the notches 29 and 30. When the bar 15, has thus been projected, the smooth portion of the same beyond the notch 25, therein, will engage the lug 23, and thus hold the detent down into engagement with the disks 27 and 28. It will be noted in this connection that one edge of the notch 25, in the bar 15, is beveled or inclined, and that this inclined surface bearing against the lug 23, of the detent, will, when the bar 15, is retracted, force the detent downwardly and the lug 24, thereon into engagement with the notches in the disks, in the manner described. After the bar 15, has thus been projected or pushed laterally a sufficient extent to disengage the rightangular portion 16, of the bar from the notch 9, in the lug 8, on the side of the casing, the locking bar 15, may be revolved by means of a milled head 17, and said rightangular portion swung downwardly to a vertical position and out of engagement with the wheel, thus unlocking the bicycle.

On the outer surface of the bell or gong 38, adjacent to its inner edge, is arranged an annular series of numbered divisions or scale markings which coact with the fixed pointer or index finger 41, arranged on the casing as shown. By arranging the bell 38, in certain positions on the arbor 35, with respect to the lug 32, on the disk 28, and arranging the disk 27, on the stub shaft 33, at certain other positions, a combination may be formed by means of which the notches in the disks may be brought into a position to release the detent by turning the bell and its arbor in certain directions as will be readily understood. In the rear side of the casing immediately in line with the end of the detent 21, is formed a secret observation hole 42, through which the position of the notches in the disk may be ascertained should the combination of the lock be forgotten.

In addition to the locking mechanism contained in the casing 1, I also provide a bell sounding mechanism comprising a clapper 43, which is fixed on the outer end of a curved spring wire arm 44, the outer end of which projects through a slot 45, in the front plate of the casing. The inner portion of the clapper arm 44, is in the form of a coil spring 46, arranged on a stud 47, secured to the back of the casing. The inner end of the arm or rod 44, bears against the inner side of one end of the casing while the longer outer portion of the arm or rod is normally held in engagement with a pawl 48, pivoted on a stud secured to the rear of the casing as shown. Fixed to the locking bar 15, is a trip collar 49, which, when the locking bar is retracted or pulled laterally in the casing by the operating lever 10, will engage and trip the pawl 48, causing the latter to bear against the clapper rod or arm and thus force the same downwardly against the tension of the coil spring portion 46 thereof, which, latter, after the trip collar passes the pawl 48, will bring the clapper back again into forcible engagement with the bell 38, thereby sounding the same. The trip collar 49, is provided with a beveled flange 50, which engages a beveled lug 51, on the pawl 48, and readily slides on the same and rocks the pawl downwardly to actuate the bell clapper in the manner described. After the operating bar has thus been retracted or pulled laterally in the casing by the operating lever 10, and said lever is released, the spring 19, on the operating bar will pull the same back through the casing until the collar 49 again comes into engagement with the adjacent end of the casing. In the backward movement of the operating rod, the flange on the collar 49, coming into contact with the lug 51, on the pawl 48, rocks the latter upwardly and thus permits the collar to pass the pawl. In order to facilitate the operation of the lever 10, a cord is preferably connected to the outer end thereof and extends up to the handles of the machine or to any other place within convenient reach of the rider.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. A combined vehicle lock and bell, comprising a slidably mounted locking-bolt adapted for engagement with a moving part of a vehicle, locking means for said bolt, a spindle having means for controlling said bolt-locking means to lock and unlock the bolt, a bell mounted on said spindle, and means operable by said bolt for sounding the bell.

2. A combined vehicle lock and bell, comprising a slidably mounted locking-bolt adapted for engagement with a moving part of the vehicle, locking means for said bolt, a spindle having means for controlling said bolt-locking means to lock and unlock the bolt, a bell mounted on said spindle and a pivoted member extending into the path of said bolt and operable thereby for sounding the bell.

3. A combined vehicle lock and bell comprising a slidably mounted locking bolt adapted for engagement with a moving part of the vehicle, locking means for said bolt, a spindle having means for controlling said bolt-locking means to lock and unlock the bolt, a bell mounted on said spindle, a pivoted member extending into the path of said bolt, and a laterally extending member carried by the bolt for engaging said pivoted member to sound the bell.

4. A combined vehicle lock and bell, comprising a slidably mounted spring-retracted locking bolt adapted for engagement with a moving part of a vehicle, a detent arranged in the path of said bolt, means on said bolt for engagement by said detent whereby said bolt is locked into operative position, means for sliding said bolt against tension of its spring, a spindle having means for controlling said detent to lock and unlock the bolt, a bell on said spindle, and means arranged in the path of and operable by said bolt for sounding the bell.

5. In a combined bicycle lock and bell, a casing, means to secure said casing to a bicycle, a spindle extending into said casing, a bell on said spindle, a locking-bolt slidably mounted in said casing and adapted for engagement with a moving part of a bicycle whereby the latter is locked, means for locking said bolt in operative position, means for releasing said locking-means operable by the bell spindle, and means actuated by the movement of said locking bolt to sound the bell.

6. In a combined lock and bell, a casing, a bell arbor or spindle revolubly mounted in said casing, a bell secured to said arbor, a spring-retracted locking bolt adapted to be engaged with a moving part of a bicycle whereby the latter is locked, means for holding said locking bolt in locked position, means operable by said bell arbor to lock said bolt-holding means in operative position and to release said means, and means actuated by the movement of said locking bolt in one direction to sound the bell.

In testimony whereof I have hereunto set my hand in presence of two subscribing witnesses.

LOUIS PRISANT.

Witnesses:
SIGO FARKAS,
PAUL FARKAS.

Copies of this patent may be obtained for five cents each, by addressing the "Commissioner of Patents, Washington, D. C."